(12) United States Patent
Pavlou et al.

(10) Patent No.: US 12,443,744 B2
(45) Date of Patent: Oct. 14, 2025

(54) SYSTEMS AND METHODS TO SECURE AUTHENTICATION DATA FOR ACCESSING RESOURCES IN A DISTRIBUTED MANNER

(71) Applicant: Citrix Systems, Inc., Fort Lauderdale, FL (US)

(72) Inventors: Chris Pavlou, Boca Raton, FL (US); Daniel G. Wing, Truckee, CA (US)

( * ) Notice: Subject to any disclaimer, the term of this patent is extended or adjusted under 35 U.S.C. 154(b) by 854 days.

(21) Appl. No.: 17/501,500

(22) Filed: Oct. 14, 2021

(65) Prior Publication Data
US 2023/0122215 A1  Apr. 20, 2023

(51) Int. Cl.
| | | |
|---|---|---|
| G06F 21/62 | (2013.01) | |
| G06F 21/35 | (2013.01) | |
| G06F 21/45 | (2013.01) | |
| G06K 19/07 | (2006.01) | |
| H04L 9/08 | (2006.01) | |

(52) U.S. Cl.
CPC .......... *G06F 21/6245* (2013.01); *G06F 21/35* (2013.01); *G06F 21/45* (2013.01); *G06K 19/0723* (2013.01); *H04L 9/0897* (2013.01)

(58) Field of Classification Search
CPC ...... G06F 21/35; G06F 21/45; G06F 21/6245; G06K 19/0723; H04L 2209/76; H04L 9/0822; H04L 9/0897; H04L 9/3226
See application file for complete search history.

(56) References Cited

U.S. PATENT DOCUMENTS

| | | | | |
|---|---|---|---|---|
| 2015/0332262 A1* | 11/2015 | Lingappa | ........... | G06Q 20/3823 705/71 |
| 2016/0036809 A1* | 2/2016 | Bhimanaik | ........... | H04L 63/102 726/4 |
| 2017/0094509 A1* | 3/2017 | Mistry | .................... | H04W 4/50 |
| 2022/0086134 A1* | 3/2022 | Xie | ........................ | H04L 67/141 |
| 2022/0408261 A1* | 12/2022 | Everson | ................. | H04L 9/3242 |
| 2023/0122215 A1* | 4/2023 | Pavlou | .................. | H04L 9/3226 713/168 |

* cited by examiner

*Primary Examiner* — Theodore C Parsons

(57) ABSTRACT

Described embodiments provide systems and methods for securely storing private information of a user on a device of the user. A server may register a mobile device to store credentials of a user thereon, based on authentication of the user of the mobile device. The server may encrypt credentials of the user using a key of the server. The server may send the encrypted credentials to the registered mobile device for storage thereon without the key. The server may send a code to an endpoint device to initiate authentication of the user with use of the mobile device. The server may receive the encrypted credentials from the mobile device in response to the authentication. The server may decrypt the encrypted credentials using an encryption key of the server. The server may send the decrypted credentials to the endpoint device to authenticate the user at the endpoint device.

14 Claims, 11 Drawing Sheets

SYSTEMS AND METHODS TO SECURE AUTHENTICATION DATA FOR ACCESSING RESOURCES IN A DISTRIBUTED MANNER

FIELD OF THE DISCLOSURE

The present application generally relates to protecting private and/or sensitive information of a user from malicious entities, including but not limited to systems and methods for securing authentication data for accessing resources, in a distributed manner.

BACKGROUND

In certain authentication processes, a component of a network environment stores private information of a user. The component of the network environment uses the stored private information to provide the user with access to a resource or application, without having to request the private information from the user. In most authentication processes, the private information (e.g., credentials) of the user can be used to verify an identity of the user. Upon successful verification of the identity of the user, the user can access or use the resource or application. As such, authentication processes can provide protection against unauthorized usage of (or access to) a resource or application.

SUMMARY

This Summary is provided to introduce a selection of concepts in a simplified form that are further described below in the Detailed Description. This Summary is not intended to identify key features or essential features, nor is it intended to limit the scope of the claims included herewith.

In certain scenarios, the network environment includes a centralized location (e.g., a server) to store private or other sensitive information (e.g., passwords, answers to security challenges etc.). As such, a malicious entity can attempt to perform an unauthorized retrieval and/or usage of the private information stored in the component of the network environment. If the malicious entity accesses the private information in the centralized storage location, the malicious entity can use the private information to perform an unauthorized action, such as accessing a resource or application by utilizing the private information of the user.

The present disclosure is directed towards systems and methods for securely storing and/or maintaining private, secured, confidential, and/or sensitive information of a user on at least one device of the user. For instance, the systems and methods described herein can store encrypted credentials of a user (e.g., secret information of a user) on a registered mobile device associated with the user (or other devices of a user), wherein the encrypted credentials may be used for accessing and/or using one or more applications (e.g., an application resource, such as a web application, SaaS application and/or remote-hosted network application). According to the systems and methods, the encrypted credentials can be stored and/or maintained in the mobile device without the key used for encrypting the credentials, rather than being stored with said key and/or other encrypted credentials in a centralized or common storage of a computing device (e.g., a server). As such, the systems and methods described herein can prevent malicious actors or bots from accessing sensitive, secured and/or critical information, and/or performing unauthorized actions in a computing system and/or network, by decentralizing the storage of sensitive information associated with the user.

For instance, according to the systems and methods disclosed herein, encrypted credentials of a user (e.g., secret/private information of a user, such as passwords, user identification, biometric information) can be stored and/or maintained in one or more mobile or personal devices without the key for encrypting the credentials, rather than being stored, with said key and/or other encrypted credentials, in a single/shared location, repository and/or device (e.g., a server). By decentralizing or otherwise distributing (e.g., across one or more devices) the storage of encrypted sensitive information associated with the user (e.g., eliminating an attack vector), apart or separated from keys used for encrypting the sensitive information, the systems and methods described herein can prevent malicious actors or bots from accessing both the key and the encrypted credentials by breaking/hacking into a single location, and/or performing unauthorized actions in a computing system and/or network. For instance, if a malicious actor gains access to the encrypted credentials stored in the mobile device(s), the malicious actor would be unable to actually use the encrypted credentials, given that the key for encrypting the credentials is stored in another location (e.g., a server). Conversely, if a malicious actor only gains access to a server (e.g., a server storing the key for encrypting the credentials), for example, the malicious actor would be unable to use the stored key to decrypt the credentials, given that the credentials themselves are stored in a separate location (e.g., in the mobile device(s)).

In one aspect, the present disclosure is directed to a method for securely storing private information of a user on a device of the user. The method can include registering, by a server, a mobile device to store credentials of a user thereon, based on authentication of the user of the mobile device. The server may encrypt credentials of the user using a key of the server. The server may send the encrypted credentials to the registered mobile device for storage thereon without the key. Responsive to a request for the credentials from an endpoint device different than the mobile device, the server may send a code to the endpoint device to initiate authentication of the user with use of the mobile device, to initiate a transfer of the encrypted credentials from the mobile device to the server. The server may receive the encrypted credentials from the mobile device in response to the authentication of the user. The server may decrypt the encrypted credentials using an encryption key of the server. The server may send the decrypted credentials to the endpoint device to authenticate the user at the endpoint device, to enable access to a remote application via the endpoint device.

In certain embodiments, the server may receive a request from a computing device to register the mobile device. The server may send a code to the computing device for registering the mobile device with the server. In some embodiments, the computing device can be caused to render the code as a quick response (QR) or scannable code, for the mobile device to scan. In certain embodiments, the server may send a prompt to the user to provide the credentials, responsive to the authentication of the user on the mobile device. The server may receive the credentials of the user from a computing device. In some embodiments, sending the credentials to the endpoint device may comprise encrypting, by the server, the credentials using a key of the endpoint device. In certain embodiments, the server may send the credentials encrypted using the key of the endpoint device to the endpoint device.

In one aspect, the present disclosure is directed to a method for securely storing private, confidential, and/or sensitive information of a user on a device of the user, such as a mobile device. The method can include registering, by a server, a mobile device to store credentials of a user, based on authentication of the user on the mobile device. The server may receive credentials of the user. The server may encrypt the credentials using a key of the server. The server may send the encrypted credentials to the registered mobile device for storage thereon without the key.

In certain embodiments, the server may receive a request from a computing device to register the mobile device. The server may send a code to the computing device for registering the mobile device with the server. In some embodiments, the computing device may be caused to render the code as a quick response (QR) or scannable code, for the mobile device to scan. The server may send a prompt to the user to provide the credentials, responsive to the authentication of the user on the mobile device. In certain embodiments, the server may receive the credentials of the user from a computing device. In some embodiments, the server may receive a request from an endpoint device for the credentials. The server may send a code to the endpoint device to initiate authentication of the user at the mobile device. In certain embodiments, the server may receive the encrypted credentials responsive to the authentication of the user. The server may decrypt the encrypted credentials to obtain the credentials, using an encryption key of the server. In some embodiments, the server may encrypt the credentials using a key of the endpoint device. The server may send the credentials encrypted using the key of the endpoint device to the endpoint device.

In one aspect, the present disclosure is directed to a method for accessing private, confidential, and/or sensitive information of a user securely stored on a device of the user, such as a mobile device. The method can include receiving by a server, a request from an endpoint device for credentials of a user. The server may determine a mobile device registered with the server for storing an encrypted version of the credentials. The server may send a code to the endpoint device to initiate authentication of the user at the mobile device, to initiate a transfer of the encrypted credentials from the mobile device to the server. The server may receive the encrypted version from the mobile device responsive to the authentication of the user.

In certain embodiments, the server may obtain the credentials from the encrypted version, using an encryption key of the server. The server may encrypt the credentials using a key of the endpoint device. In some embodiments, the server may send the credentials encrypted using a key of the endpoint device to the endpoint device.

In one aspect, the present disclosure is directed to a server comprising at least one processor. The at least one processor may be configured to register a mobile device to store credentials of a user thereon, based on authentication of the user of the mobile device. The at least one processor may be configured to encrypt credentials of the user using a key of the server. The at least one processor may be configured to send the encrypted credentials to the registered mobile device for storage thereon without the key. Responsive to a request for the credentials from an endpoint device different than the mobile device, the at least one processor may be configured to send a code to the endpoint device to initiate authentication of the user with use of the mobile device. The at least one processor may be configured to receive the encrypted credentials from the mobile device in response to the authentication of the user. The at least one processor may be configured to decrypt the encrypted credentials using an encryption key of the server. The at least one processor may be configured to send the decrypted credentials to the endpoint device to authenticate the user at the endpoint device.

In one aspect, the present disclosure is directed to a non-transitory computer readable medium storing program instructions. The program instructions stored in a non-transitory computer readable medium may cause at least one processor to register a mobile device to store credentials of a user thereon, based on authentication of the user of the mobile device. The program instructions may cause the at least one processor to encrypt credentials of the user using a key of the server. The program instructions may cause the at least one processor to send the encrypted credentials to the registered mobile device for storage thereon without the key. Responsive to a request for the credentials from an endpoint device different than the mobile device, the program instructions may cause the at least one processor to send a code to the endpoint device to initiate authentication of the user with use of the mobile device. The program instructions may cause the at least one processor to receive the encrypted credentials from the mobile device in response to the authentication of the user. The program instructions may cause the at least one processor to decrypt the encrypted credentials using an encryption key of the server. The program instructions may cause the at least one processor to send the decrypted credentials to the endpoint device to authenticate the user at the endpoint device.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 6:
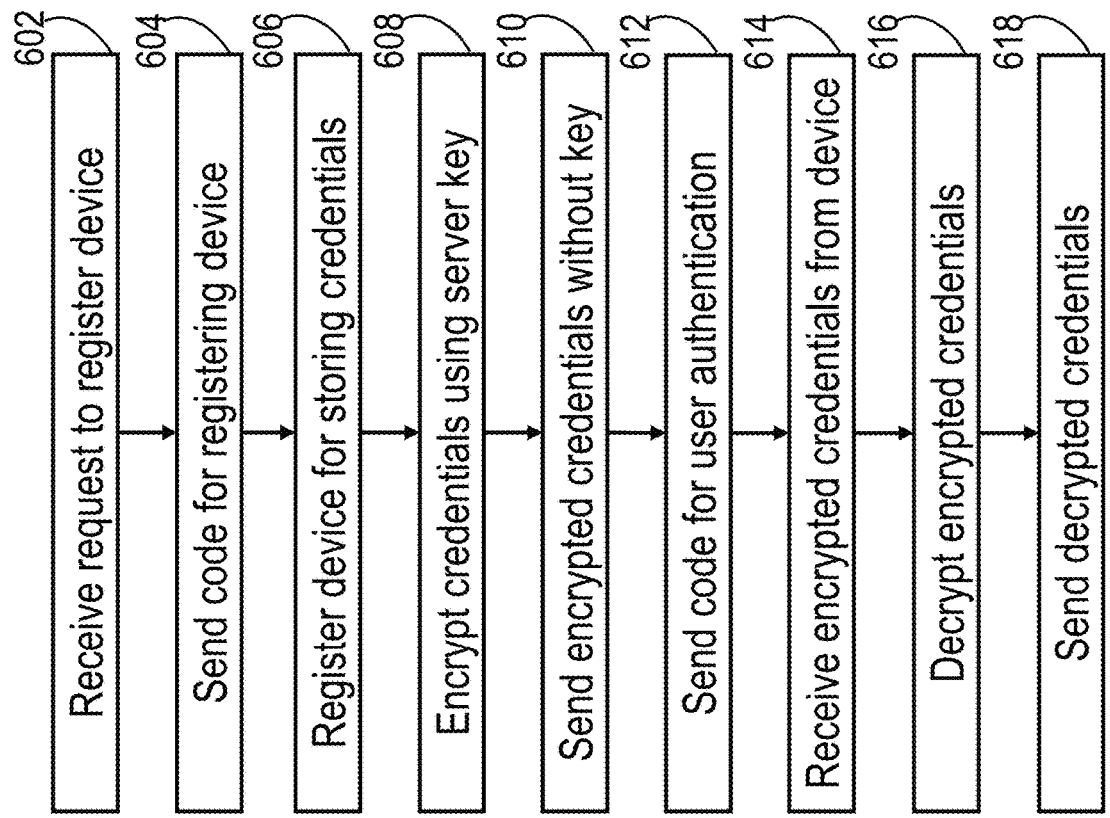
Figure 7:
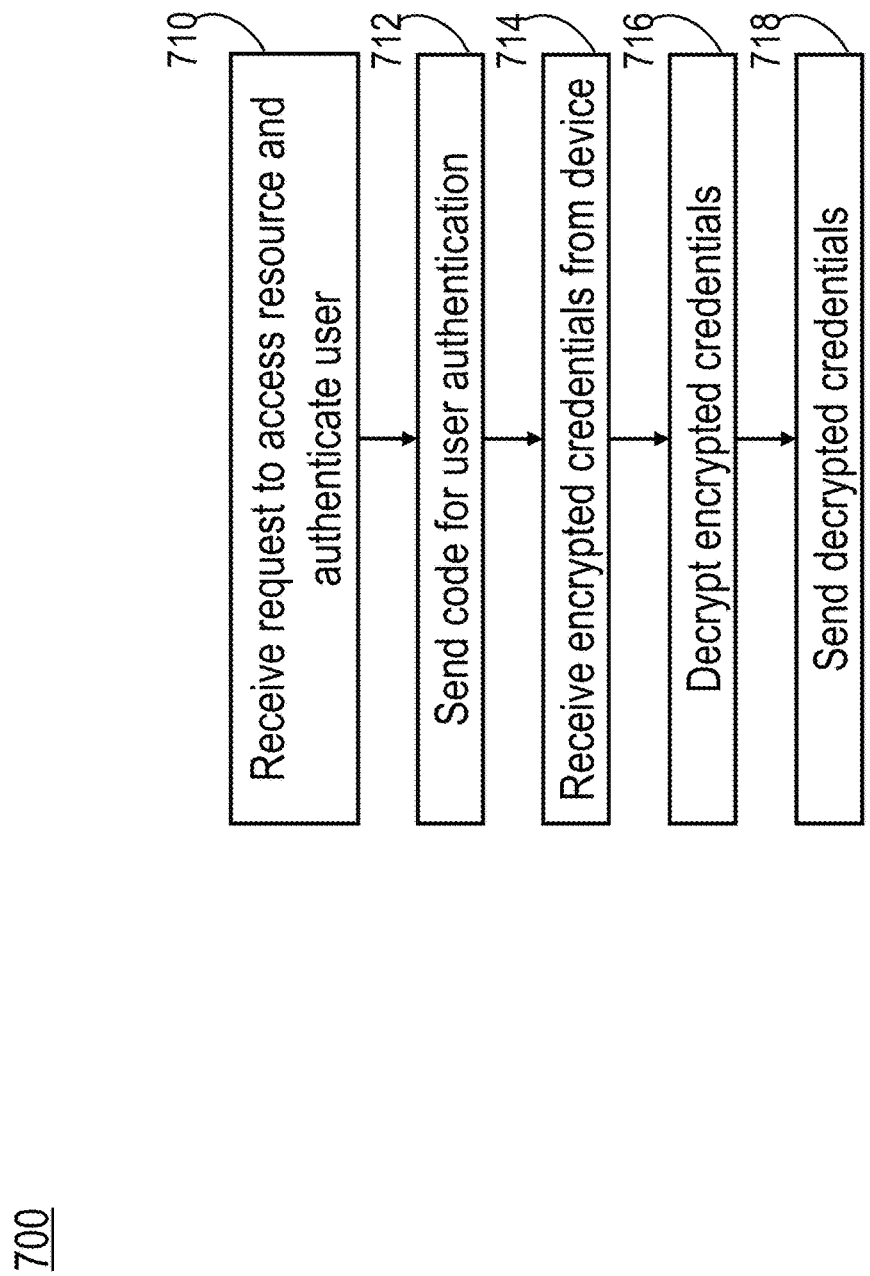

FIG. 6 is a flow diagram of an example method for storing information of a user on at least one device of the user in a distributive fashion, in accordance with an illustrative embodiment; and FIG. 7 is a flow diagram of an example method for accessing stored information of a user (e.g., stored in a distributive manner) on at least one device of the user, in accordance with an illustrative embodiment.

DETAILED DESCRIPTION

In certain authentication processes (e.g., during authentication to a remote service and/or an application), a component of a network environment (e.g., a computing device, such as a server) may store and/or maintain information of a user, such as credentials associated with the user (e.g. a username, a password, a personal identification number, and/or other credentials). In one example, the credentials associated with the user may include or correspond to one or more security assertion markup language (SAML) assertions, one or more Kerberos tickets, one or more long-lived tokens, one or more certificates, plain text, one or more encrypted passwords, and/or other data/information associated with (or specific to) the user. In certain embodiments, the component of the network environment may use the stored private, confidential, and/or sensitive information to provide the user with access to an application and/or resource, without having to obtain or request the private information from the user. In current technology, the component of the network environment may store the credentials, for instance, using a centralized storage location, such as a database and/or a file in a server. In some embodiments, the centralized storage location may include and/or maintain additional private information of the user (e.g., to access other resources or applications), and/or private information of other users. As such, an attempt and/or request to access and/or use an application can be validated and/or authenticated by accessing the stored private information without requesting input or further information from the user(s). The private information can instead be accessed, obtained and/or acquired from the centralized storage location rather than directly from the user, and thus access to a user's applications can occur with use of information available on the system. This can pose a significant security risk, if the storage location is breached or otherwise accessed by others unauthorized to receive the information, such as hackers or other malicious actors. Simply put, current centralized data storage of user information is a high valued target of malicious actors looking to steal identities or perform other bad acts (e.g., ransom user's personal data). Efforts to fortify computing infrastructure or otherwise reduce its attack surface have been ineffective at eliminating this risk or otherwise deterring attempts by malicious actors to access those environments. Furthermore, centralized systems that store user data are inherently risky because such systems require the aggregation of sensitive information to be in one single place. The risk is especially high today as malicious actors are becoming more and more sophisticated in the attacks on computing environments for large retail or commercial businesses.

Furthermore, although convenient for authentication purposes, storing private information of the user(s) in a centralized, shared and/or common storage location can pose a security risk to a computing system and/or a network. For example, a malicious entity can attempt to perform an unauthorized retrieval and/or usage of the stored private information by attempting to access the centralized storage location, without having to perform a similar attempt on other components of the computing system. If the malicious entity accesses the private information in the centralized storage location, the malicious actor can use the private information to perform an unauthorized action, such as accessing a resource or application by utilizing private information of one or more users. The systems and methods described herein can prevent malicious actors or bots from accessing sensitive, private and/or critical information by encrypting and/or decentralizing the storage of sensitive information associated with the user. For example, the systems and methods may include a novel approach for storing encrypted credentials (or other private information) of the user in a decentralized or otherwise distributed fashion using one or more devices registered to the user apart from encryption keys, rather than storing the encrypted credentials and/or the keys in a same server, for instance.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for securely storing authentication data for accessing resources, in a distributive manner.

A. Network and Computing Environment

Figure 1A:
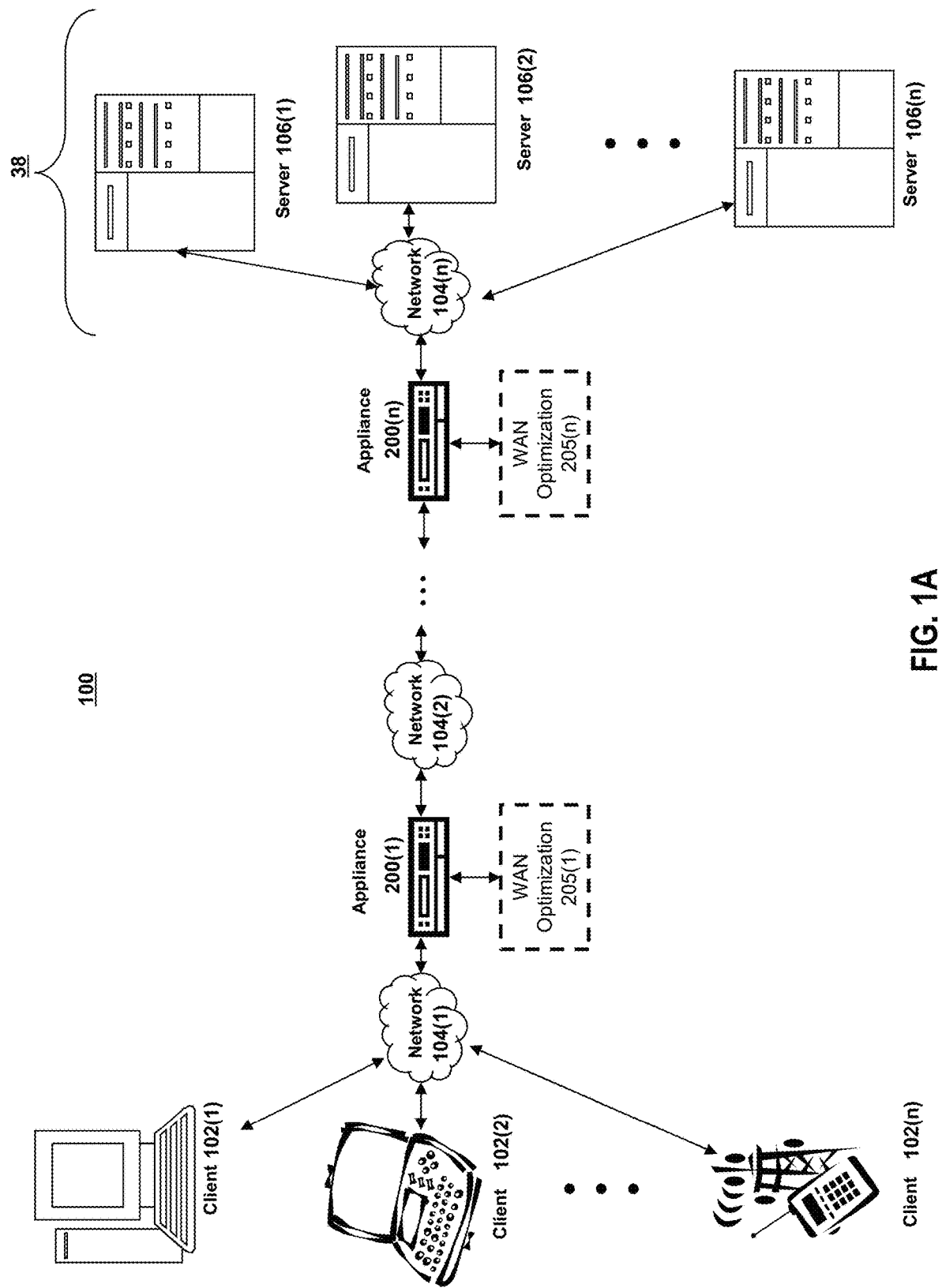
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
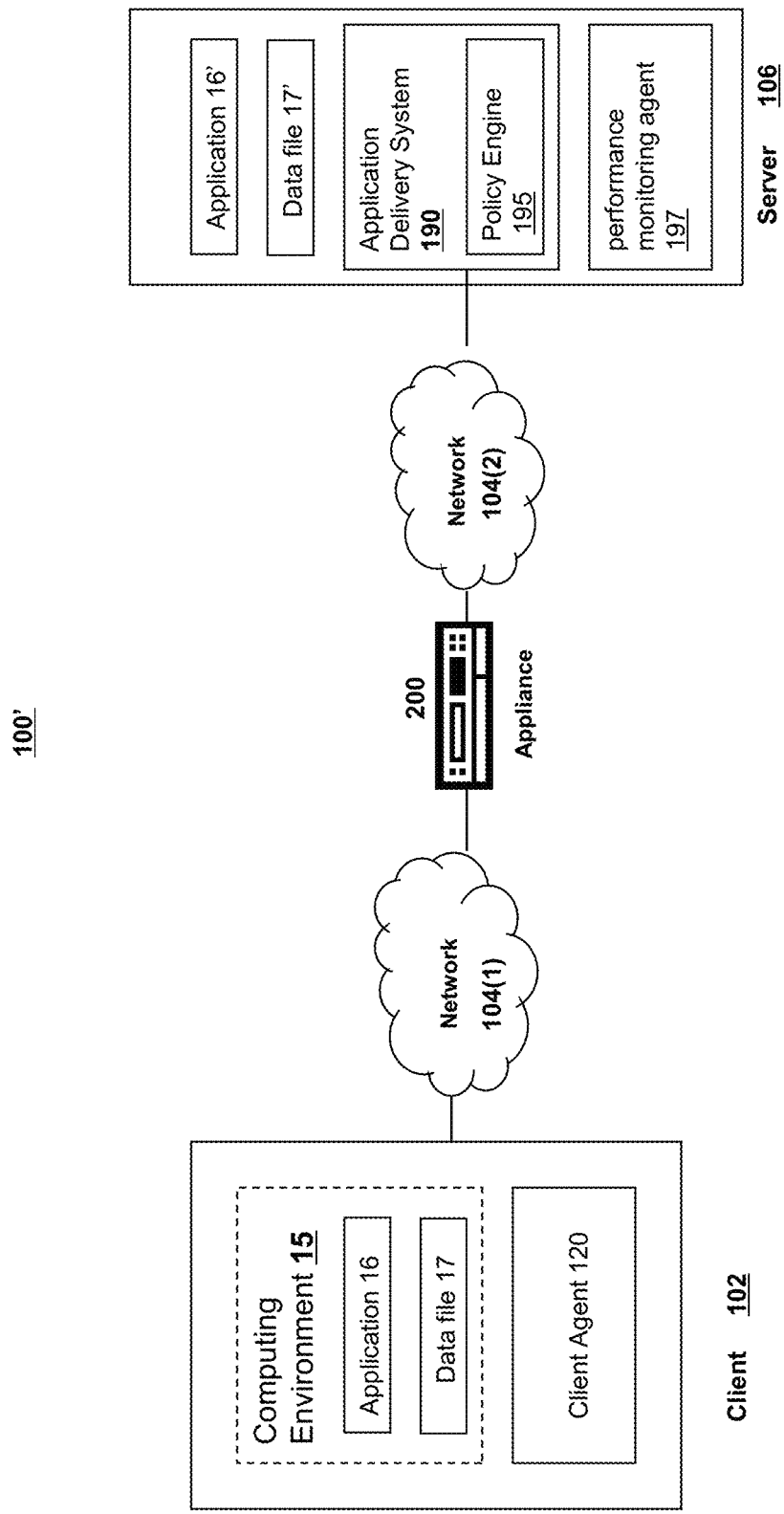
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
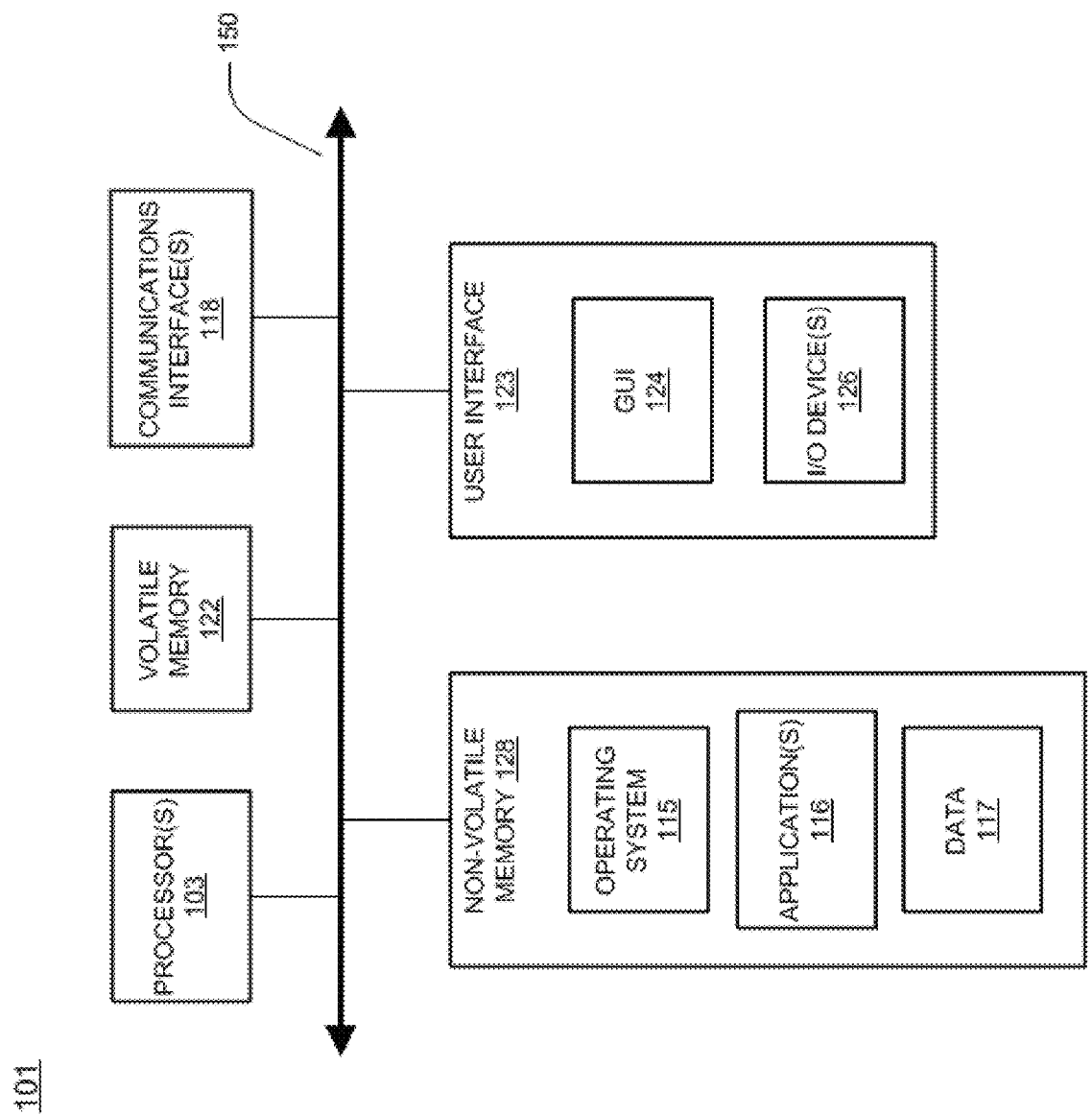
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
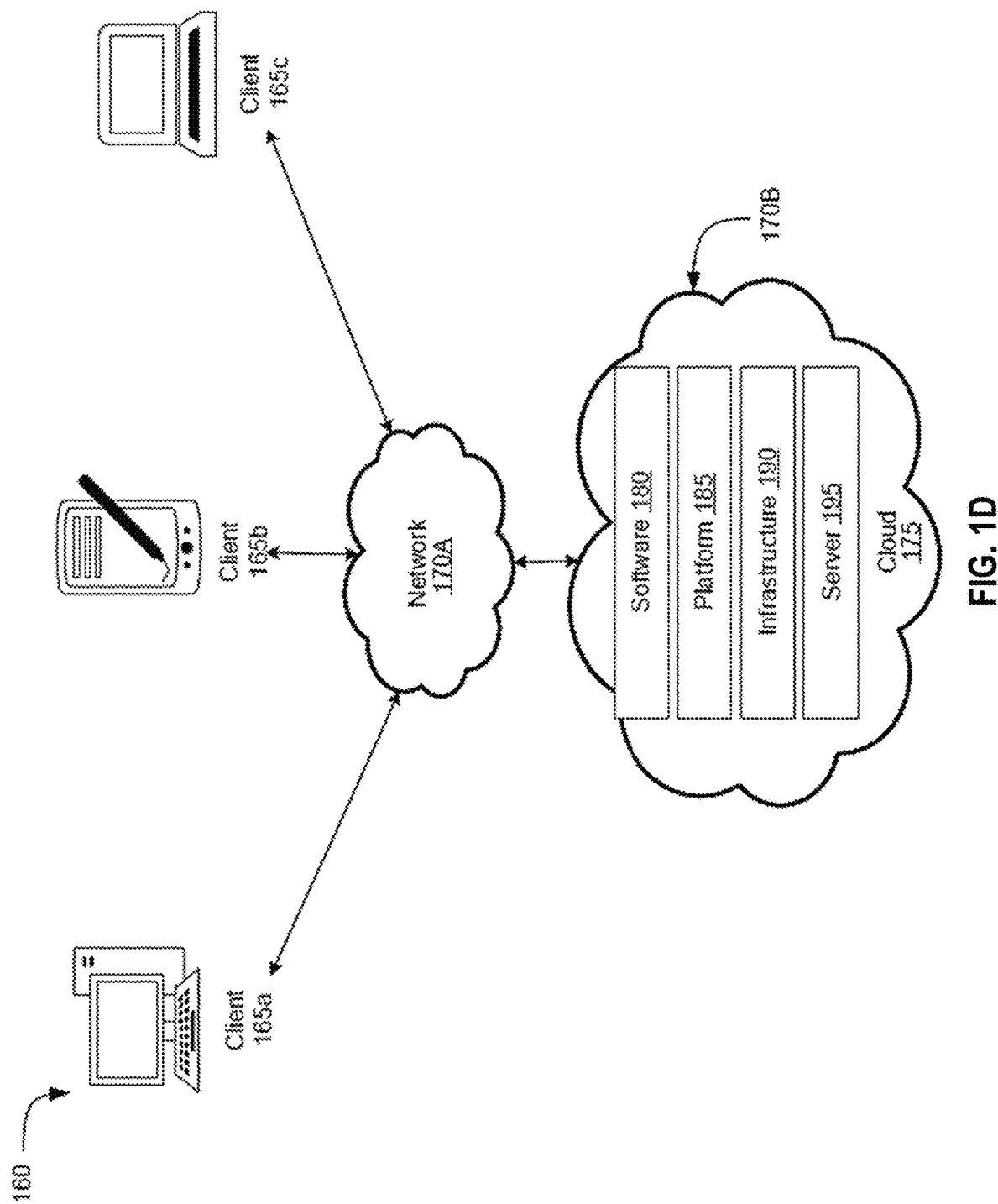
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
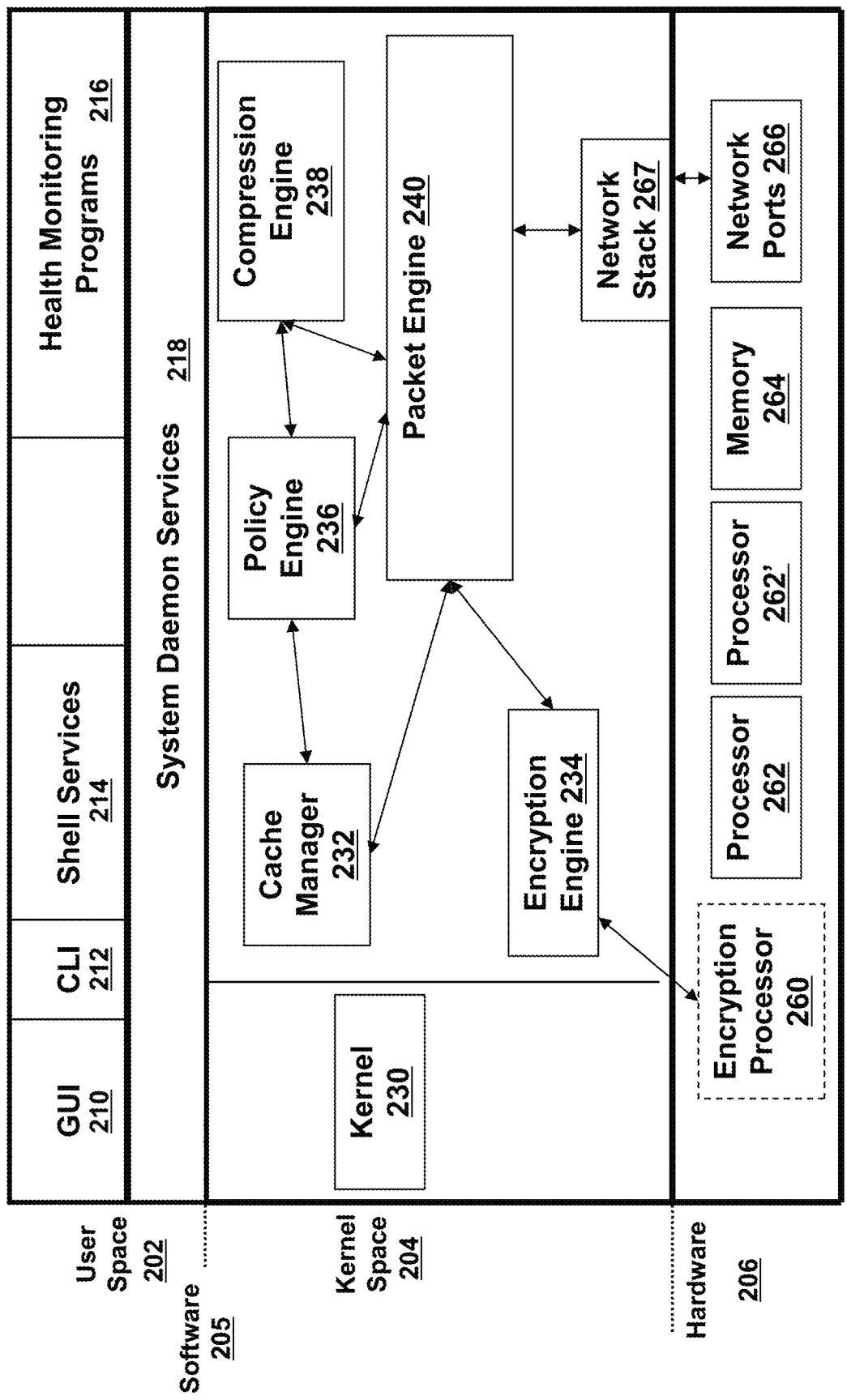
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Securing Authentication Data in a Distributive Manner The systems and methods presented herein include a novel approach for securely storing and accessing user information. The approach may include maintaining private, secured, confidential, and/or sensitive information of a user on at least one device of the user. For instance, the systems and methods described herein can store encrypted credentials of a user (e.g., secret information of a user, such as passwords, user identification, biometric information) on at least one mobile device (or other devices) associated with (and/or registered to) the user. According to the systems and methods, the encrypted credentials can be stored and/or maintained in the mobile device(s) without the key used for encrypting the credentials, rather than being stored, with said key and/or other encrypted credentials, in a single/shared location, repository and/or device (e.g., a server). As such, the systems and methods described herein can prevent malicious actors or bots from accessing sensitive, secured and/or critical information, and/or performing unauthorized actions in a computing system and/or network, by decentralizing or otherwise distributing (e.g., across one or more devices) the storage of encrypted sensitive information associated with the user (e.g., eliminating an attack vector), apart or separated from keys used for encrypting the sensitive information. For instance, if said malicious actors obtain the encrypted credentials stored in the mobile device(s), the malicious actors may be unable to actually use the encrypted credentials, given that the key for encrypting the credentials is stored in another location (e.g., separately secured at a server). Conversely, if malicious actors only gain access to a server (e.g., a server storing the key for encrypting the credentials), for example, the malicious actors would be unable to use the key to decrypt the credentials, given that the credentials are stored in a separate location (e.g., secured in the mobile device(s)). As such, malicious actors attempting to obtain the credentials cannot merely access a single or centralized location to obtain the credentials, but rather must attempt to access a plurality of separate locations (e.g., each protected by additional techniques, such as biometric or other user authentication) to obtain the information for using/accessing the credentials.

In certain embodiments, the at least one device associated with the user (e.g., to store credentials of a user thereon) can be any type and form of computing device, such as any desktop computer, laptop computer, or mobile device (e.g., smart phone, tablet, smart glasses) capable of communication over at least one network. The at least one device (e.g., a mobile device) may support and/or use one or more authentication processes to authenticate the user of the device(s). A mobile device of the user, for example, may use biometric authentication (e.g., fingerprint authentication, face recognition, eye/iris recognition, and/or recognition of other biometric identifiers) and/or other types of authentication (e.g., two-factor authentication, single-factor authentication, multi-factor authentication, password authentication, challenge handshake authentication, and/or other types of authentication) to authenticate and/or validate the user.

In certain embodiments, the user may register or otherwise enroll the mobile device, for example, with an organization, a service (e.g., a credentials/password management service), and/or other entities. Responsive to registering the mobile device (e.g., as a trusted or authentication-protected device for the user to store credentials), the mobile device may be associated with (or related to) the user (e.g., associated to a user account for accessing and/or using the service to which the mobile device was registered to). During the registration process (e.g., registration of a device of the user), a computing device, such as a server, may encrypt (e.g., encode or cryptographically protect) the private information of the user (e.g., credentials of the user to access/use a certain resource or application). Responsive to encrypting the credentials, the server may send, transmit, communicate, and/or provide the encrypted credentials to the registered device for storage thereon (e.g., instead of storing the encrypted credentials in the computing device or server of the application or resource). The server may send the encrypted credentials to the device of the user without the key (e.g., key of the server) used to encrypt or decrypt the credentials. In certain embodiments, the key can be stored and/or maintained in the server, and/or in a secured storage accessible to the server.

In certain embodiments, the device of the user may store and/or maintain the encrypted credentials (e.g., using a local storage of the device), and/or may require user authentication (e.g., biometric authentication, two-factor authentication, single-factor authentication, multi-factor authentication, password authentication, challenge handshake authentication, and/or other types of authentication) to access, use and/or obtain the encrypted credentials. In one example, a user attempting to access/use (e.g., log in) a resource and/or application may use the device of the user (e.g., mobile device) to release stored credentials. Biometric authentication at the device, for instance, can be used to confirm whether the user has authorized a service (e.g., credentials management service) to access the encrypted credentials stored in the device. Responsive to confirming a device registration and/or user authorization, the device can send and/or release the encrypted credentials to the server, for example. The corresponding application and/or resource (e.g. hosted and/or included in one or more servers) may use the credentials (e.g., decrypted credentials) to provide the user with access to the application and/or resource. For example, a server of the credentials management service may decrypt and/or decode the received encrypted credentials using an encryption key of the server (e.g., a private key). In response to decrypting the credentials, a corresponding application or resource (e.g., in another server) may use the decrypted credentials (e.g. password and/or username) to log in the user into an application and/or resource (e.g., to provide access to the application or resource).

In certain embodiments, the server (e.g., credentials management service of the server) can obtain and/or access the private information of the user (e.g., obtain the credentials after an initial log in, for single sign-on purposes) from the mobile device, for example, by sending a notification (e.g., a push notification and/or other types of notifications) to the mobile device. The user may provide, release, and/or indicate the private information in response to the notification. In one example, the user may launch and/or use a mobile application (e.g., launched or triggered via the notification) for unlocking or otherwise accessing a local storage of the mobile device (e.g., a local storage maintaining encrypted credentials of the user). Biometric authentication via the mobile application, for instance, can be used to unlock or otherwise access the local storage of the mobile device. For instance, the mobile application may request the user to provide biometric input via an interface of the mobile device (e.g., fingerprint reader, iris camera/scanner, voice recorder) to perform the biometric authentication. A biometric authentication approach, for example, can use biological characteristics of a user to verify the identity of the user. Biometric authentication approaches may compare physical and/or behavioral traits of a user to stored, confirmed, and/or authentic data of the user. If both samples of the biometric data match, the user is authenticated. Responsive to a successful biometric match or authentication of the user (which ensures that the specific user is authorizing the release/use of the encrypted credentials), a client management service, for instance, can be authorized to receive the encrypted credentials from the mobile device. Responsive to accessing the encrypted credentials (or other private information) from the local storage, the mobile device may send or otherwise communicate the encrypted credentials to the credentials management service of the server, for example. The server may decrypt the received encrypted credentials, thereby allowing the credentials management service to use the decrypted credentials to provide the user with access to a desired resource/application.

In certain embodiments, the server may send and/or provide a code (e.g., a QR code) to an endpoint device (e.g., a computing device, such as a laptop and/or desktop) to initiate an authentication process of the user at the mobile device. For example, a camera (or other image sensors) of the mobile device may be used to scan or otherwise analyze a code displayed via a screen of the endpoint device (e.g., during single sign-on). By scanning the code with the mobile device, the systems and methods discussed herein can ensure that a user of the mobile device is actually interacting with the corresponding endpoint device, which resolves a common attack vector of using push-based authentication.

In certain embodiments, a mobile application may store the information of the user (e.g. encrypted credentials of the user) in a local storage. In some embodiments, said mobile application may send and/or communicate the private information to the server upon request. In some embodiments, one or more keys for encrypting (or decrypting) the credentials of the user (and/or the credentials themselves) may change and/or be modified (e.g., due to an expiration of the credentials). As such, the user may update the credentials, wherein the updated credentials can be sent (e.g., by the server) or otherwise provided to the mobile device. For instance, the user may update the credentials similar to process 400 in FIG. 4A, for instance. In one example, the user may initiate a request to update credentials via a computing device 332 (similar to the request in operation 402), and can provide the updated credentials (e.g. see operations 418 and 420) to a server 106 using a computing device 332, responsive to authenticating the user via biometric authentication (e.g., see operations 412 and 414). The server 106 may encrypt the received credentials using a key of the server (e.g., see operation 426), wherein the encrypted (updated) credentials are then provided to the mobile device 312 without the key (e.g., see operation 428).

In embodiments where a mobile application (e.g., Magic Key app, associated with the credentials management service for instance) is used to authenticate the user of the mobile device, the same mobile application can be used to store and/or access private information of the user (e.g., credentials) in said mobile device. For example, a same device registration used for a credentials management service (or other services) can be used by the systems and methods described herein. The mobile application, for example, can send encrypted credentials to the server (along with other data associated with the user) during a login and/or authentication process. Certain notifications, such as push notifications, for requesting credentials of the user may be received and/or processed by the same mobile application.

In certain embodiments, the systems and methods described herein can be added and/or incorporated into an existing multifactor authentication application, such as a single sign-on (SSO) application, and/or other mobile authentication applications affiliated with third parties. A software development kit (SDK), for example, may support or implement the systems and methods discussed herein, thereby providing support or documentation for registering or otherwise enrolling the mobile device with the credentials management service, and/or for processing push notifications (e.g., to provide encrypted credentials to the server).

In some embodiments, a mobile authentication application (e.g., Magic Key app and/or an existing multifactor authentication application) may not be able to access, use and/or decrypt the encrypted information (e.g., encrypted credentials) of the user, since the mobile authentication application has no access to a key for decrypting the encrypted private information. Instead, the credentials management service of the server, for example, would securely have a particular key to decrypt, and thereby use, the private information.

Figure 3:
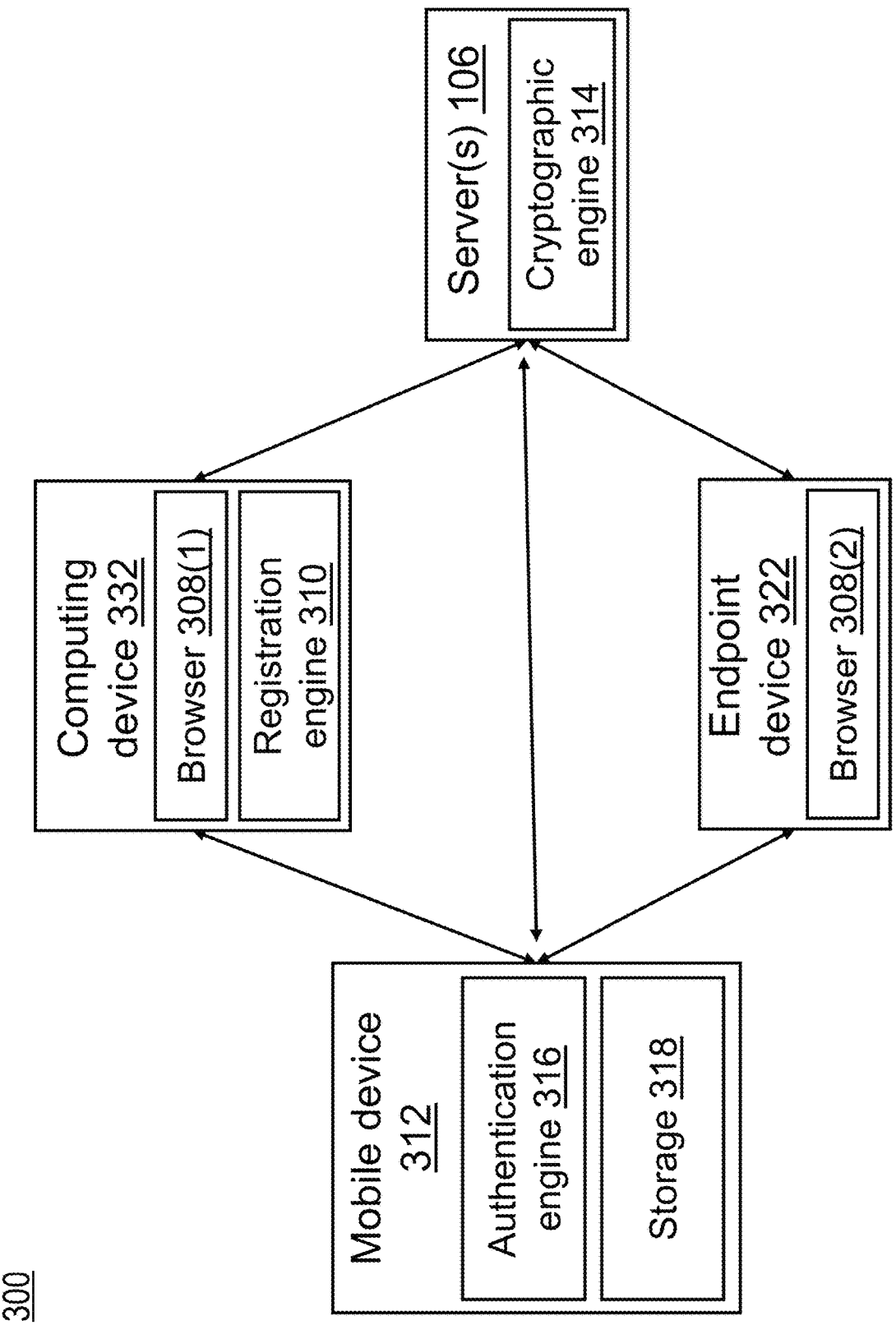
FIG. 3 is a block diagram of a system for storing and accessing information of a user in a distributive manner on at least one device of the user, in accordance with an illustrative embodiment.

In view of the above discussion regarding storing and/or maintaining private information of a user (e.g., credentials of a user) on at least one device of the user, a process and/or system for performing said storage may be beneficial, as further explained in the following passages. Referring to FIG. 3, depicted is a block diagram of one example embodiment of a system 300 for storing private information of a user on at least one device of the user (e.g., a mobile device). The system 300 may include one or more mobile devices 312 of a user, one or more computing devices 332, one or more endpoint devices 322 and/or one or more servers 106. The mobile device 312 can include or maintain or have access to an authentication engine 316 and/or a storage 318. The computing device 332 can include or maintain or have access to a browser 308 and/or a registration engine 310. The endpoint device 322 can include or maintain or have access to a browser 308. The server 106 can include or maintain or have access to a cryptographic engine 314.

Each of the above-mentioned elements or entities is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

The system 300 may include one or more servers 106. One or more of the server(s) 106 may be configured and/or designed to host a credentials management service. One or more of the server(s) 106 (e.g., a back-end server supporting HTTPS messages or transactions, and/or other servers 106) may be configured and/or designed to host one or more resources and/or other services (e.g., application resources, as a web application, SaaS application or remote-hosted network application). In certain embodiments, a server 106 may be configured and/or designed to provision the one or more resources and/or services to one or more clients 102 (e.g., one or more mobile devices 312) of a consumer or other entity (e.g., an organization or user) and/or to one or more endpoint devices 322, via one or more networks 104. For example, the client 102 (e.g., mobile device 312) may establish one or more sessions or connections (e.g., secured or otherwise, such as a SSL virtual private network connection) with one or more servers 106 to access a service/resource (e.g., via one or more URLs), such as an application resource. In another example, the server(s) 106 may receive/obtain a request (e.g., such as a HTTP request) from at least one an endpoint device 322 (e.g., a laptop, a tablet device, and/or a desktop computer) and/or mobile device 312 to access/use one or more resources (or establish the connections to access the one or more resources).

To provide a service/resource, one or more servers 106 may execute, provide, provision, and/or host one or more network application(s). In some embodiments, a service/resource may be referred to interchangeably with an application, application resource or network application. A network application can for instance include a remote-hosted application, a remote-hosted desktop, a web application or a software-as-a-service (SaaS) application. A remote-hosted desktop may be a virtual desktop hosted on the server 106 which is accessed by or remotely provisioned to a client 102 (e.g., a mobile device 312). In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP-based sessions and/or connections. SaaS applications and/or web applications may include for instance salesforce.com, SAP, Microsoft Office 365, Dropbox or Gmail service, Amazon web services, and so on.

In some embodiments, a server 106 of a credentials management service can (operate with a computing device 332 to) register one or more mobile devices 312 (or other clients 102) to store credentials of the user thereon (instead of storing the credentials of the user in the server 106). For example, a user operating the computing device 332 may access or login to the credentials management service to initiate registration of a mobile device. Registered mobile devices 312 may access, use or otherwise interact with one or more resources (e.g., an organization's restricted resources) hosted or included in other server(s) 106. Responsive to registering the mobile device(s) 312, the mobile device(s) 312 may be associated with a particular user (e.g., associated to a user account). In one example, the server 106 may register the mobile device(s) 312 responsive to receiving a request to register the mobile device(s) 312 from/via the computing device 332 (e.g., a laptop, a tablet device, and/or a desktop computer). In certain embodiments, the server 106 may send or otherwise provide a code (e.g., a QR code, a barcode, and/or other codes) to the computing device 332 and/or the endpoint device 322, for registering the mobile device 312 with the server 106 and/or authenticating the user of the mobile device 312.

In some embodiments, the server 106 can include, among other elements, a cryptographic engine 314. The cryptographic engine 314 can be implemented in hardware, or a combination of hardware and software (e.g., cryptographic software executing on a processor, as detailed above in connection with FIG. 1C), in one or more embodiments. The cryptographic engine 314 may be implemented and/or designed to perform encryption and/or decryption on the private information of the user (or other information), such as the credentials of the user. In certain embodiments, the cryptographic engine 314 may be configured and/or designed to enable protected and/or encrypted communication between components of the system 300, such as between the mobile device 312 and the server 106. Data encryption and/or decryption can include any cryptographic related operation for securing or protecting data being transmitted (e.g., credentials of the user), and can include operations such as encoding/decoding, data scrambling/unscrambling, hashing, cipher functions, crypto-keys operations/management, compression, and/or message verification. In some embodiments, the cryptographic engine 314 can be located within, outside, or adjacent to the server 106 of the credentials management service. The cryptographic engine 314 may comprise cryptographic hardware, and/or one or more programs or services that are executable individually or in some combination on hardware of the cryptographic engine 314.

In one example, the cryptographic engine 314 may be configured to encrypt credentials (or other private information) of a user (e.g., a user secret, to be stored on a mobile device 312 instead of centrally at the server 106). For instance, the cryptographic engine 314 may encrypt or otherwise encode the credentials of the user by using (or according to) a key of the server (e.g., a public key of the server). In certain embodiments, the cryptographic engine 314 may send and/or transmit the encrypted credentials (e.g. without the key of the server) to a registered mobile device 312. In alternative approaches, the encrypted credentials and the key of the server can be stored in the same or different locations within a same system/device (e.g. different storage locations within a same server), where both of these become vulnerable to a malicious entity that gains access to the single system/device. The systems and methods discussed herein further enhance the security of the network environment by storing and securing the encrypted credentials and the corresponding key(s) in separate/distinct devices. For instance, the cryptographic engine 314 may send the encrypted credentials to one or more mobile devices 312 for secured storage, while the encryption key is maintained at the server 106. The mobile device 312 may store and/or maintain the encrypted credentials in a local storage 318, for example. As such, the mobile device 312 can securely store the encrypted credentials provided by the cryptographic engine 314, thereby decentralizing the storage of the encrypted credentials and/or separating the storage of the encrypted credentials (e.g., stored in the mobile device 312) and the key(s) (e.g., stored in the server 106). In some embodiments, one or more keys associated with the server 106 may be inaccessible to (e.g., protected from) other components of the system 300, such as to the mobile device(s) 312. Hence, an unauthorized or malicious entity that gained access to one component of the system 300 (e.g., either the mobile device 312 or the server 106) would not have access to both the keys and the encrypted credentials, so as to recover the credentials.

In certain embodiments, the cryptographic engine 314 can decrypt or otherwise decode encrypted credentials of the user (e.g., received from the mobile device(s) 312). For example, the cryptographic engine 314 may decrypt encrypted credentials by using an encryption key of the server (e.g., a private key of the server). The cryptographic engine 314 may send, transmit or otherwise provide the decrypted credentials to an endpoint device 322 (e.g., to authenticate a user at the endpoint device 322, so as to access a resource or application), without storing the decrypted credentials in the server 106, for instance. In certain embodiments, the cryptographic engine 314 may encrypt the decrypted credentials using a key of the endpoint device 322 (e.g., a public key of the endpoint device 322), prior to sending/providing the credentials (e.g., encrypted using the key of the endpoint device) to the endpoint device 322. In some embodiments, one or more keys associated with the server (e.g., a private/encryption key of the server and/or a public/decryption key of the server) can be updated and/or modified across a plurality of time instances.

In some embodiments, the server(s) 106 can be part of a cloud or datacenter for instance. The server(s) 106 may include any embodiment of volatile memory 122 or non-volatile memory 128 (discussed in FIG. 1C for example) which may store files, data and/or content of the service. The server(s) 106 may communicate with other various components of the system 300 in FIG. 3 via a communications interface 118 for instance. Hence, the server(s) 106 may be similar in some aspects to the computer 101 described with reference to FIG. 1C.

The system 300 may include one or more clients 102, such as one or more mobile devices 312. The mobile device(s) 312 may include or correspond to one or more devices of a consumer of the service. For example, if the consumer is an individual or user, the mobile device(s) 312 may comprise a smartphone, a laptop (e.g., at home), a tablet device, and a desktop computer (e.g., at work), that the user may use to access an application resource (e.g., Dropbox service) and/or other resources at various times and/or locations for instance. In an example where the consumer is an organization, such as an enterprise, the consumer can extend over a number of users (e.g., management persons, staff members, IT administrators, and so on) and their associated client(s) 102 or devices (e.g., corporate-issued device, personally-owned devices, and/or registered/approved devices (e.g., in a BYOD program)). Any number of the users may access a service/resource (e.g., salesforce.com, SAP, Microsoft Office 365) from a service/resource provider, via a corporate account for the service/resource for instance.

The mobile device 312 may be configured and/or designed to store credentials that enable access one or more resource(s) over one or more networks. To access said resource(s) (e.g., via an endpoint device 322), the mobile device 312 can provide encrypted credentials of the user to the server 106, for example. The endpoint device 322 may receive and use the provided credentials to provide the user with access to the resources. In certain embodiments, the mobile device 312 may be configured and/or designed to store the encrypted credentials of a user (e.g., provided by the user via the server 106 and/or the computing device 332) using a storage 318, for example. The storage 318 included in the mobile device 312 may be configured and/or designed to store or maintain data and/or content, for example the encrypted credentials of the user. The storage 318 may include or correspond to any embodiment of volatile memory 122 or non-volatile memory 128 (discussed in connection with FIG. 1C for example) which may store the encrypted credentials and/or other private information of the user (e.g., for accessing/using one or more resources). In certain embodiments, a mobile application of the mobile device 312 (not shown) can access the encrypted credentials from the storage 318, to provide the encrypted credentials to the server 106 (e.g., to the cryptographic engine 314 of the server 106 for decryption).

In some embodiments, the storage 318 may include or correspond to a memory 264 of mobile device 312, or may include or correspond to a physical memory having a faster access time than memory 264. The storage 318 may duplicate data (e.g., original data) stored elsewhere (e.g., another mobile device 312), or maintain data previously computed, generated or transmitted to reduce the access time of the data. The storage 318 can be located within, outside, or adjacent to the mobile device 312.

In some embodiments, the mobile device 312 (e.g., an authentication engine 316 of the mobile device 312) may be configured and/or designed to authenticate and/or validate the identity of the user of the mobile device 312. For example, the authentication engine 316 of the mobile device 312 may be configured to confirm whether the current user of the mobile device 312 is the actual owner of the mobile device 312 (e.g., who is enabling the registration of the mobile device, enabling the storage of the encrypted credentials, or is enabling the retrieval of the stored encrypted credentials), rather than a malicious entity. In certain embodiments, the authentication engine 316 may use biometric authentication (e.g., fingerprint authentication, face recognition, eye recognition, and/or recognition of other biometric identifiers) and/or other types of authentication (e.g., two-factor authentication, single-factor authentication, multi-factor authentication, password authentication, challenge handshake authentication, and/or other types of authentication) to authenticate the user. If the user is successfully authenticated by the authentication engine 316 (e.g., the user is the actual owner of the mobile device 312 and/or the credentials to be stored), the mobile device 312 may be registered by the server 106 for storing the credentials. In another example, if the user is successfully authenticated by the authentication engine 316, the mobile device 312 may retrieve, send and/or provide the encrypted credentials (e.g., maintained in the storage 318) and/or other private information of the user to the server 106. In some embodiments, the authentication engine 316 can initiate and/or launch the authentication process responsive to a scan of a code by the mobile device 312 (e.g., via the computing device 332 and/or the endpoint device 322). In some embodiments, the authentication engine 316 can be located within, outside, or adjacent to the mobile device 312. The authentication engine 316 may comprise one or more programs or services that are executable individually or in some combination on hardware of the authentication engine 316.

In some embodiments, the mobile device 312 may interact with the server(s) 106 directly, or indirectly via a computing device 332, an endpoint device 322, and/or other devices intermediary between the mobile device 312 and the server(s) 106. For example, the server 106 can send a code to the endpoint device 322 to authenticate the user (e.g., via the authentication engine 316) with use of the mobile device 312. The user, for instance, may scan the code (e.g. displayed via the endpoint device 322) with an image sensor of the mobile device 312 to initiate authentication of the user. In another example, the mobile device 312 can scan a code (e.g., QR code) displayed in a computing device 332 to register the mobile device 312 (e.g., using the registration engine 310) with the server 106.

In some embodiments, the system 300 may include one or more computing devices 332 and/or one or more endpoint devices 322. The computing device(s) 332 and/or endpoint device(s) 322 may be located at any one of various points or in any of various communication paths, for example between two networks 104, within a computing and/or network environment 100. In other embodiments, the computing device(s) 332 and/or endpoint device(s) 322 may be located on a network 104. In some embodiments, the computing device(s) 332 and/or endpoint device(s) 322 may act as a proxy to provide access to the one or more servers 106, provide security and/or act as a firewall between the mobile device 312 and the server(s) 106. In some embodiments, the computing device(s) 332 and/or endpoint device(s) 322 can include, among other elements, a browser 308. The browsers 308(1) and 308(2) can be configured to provide and/or display a code (e.g., a QR code, a 2D barcode, a data matrix, and/or other types of codes) for user authentication and/or mobile device registration. For instance, the browser 308(1) of the computing device 332 may render or otherwise illustrate the code as a QR code for scanning by the mobile device 312 (e.g. to register the mobile device 312 to the server 106). In one example, the browser 308(2) of the endpoint device 332 may render the code as a QR code (or other 2D or scannable codes) for scanning by the mobile device 312 (e.g. to authenticate a user of the mobile device 312 prior to accessing stored encrypted credentials).

In some embodiments, the computing device 332 (e.g., a registration engine 310 of the computing device 332) may be configured and/or designed to register the mobile device 312 (or other devices of the user) with the server 106. Registered mobile devices 312 may store credentials or other confidential information on behalf of the user and/or the credentials management service. In one example, the user can initiate a request to register the mobile device 312, or perform the registration itself, via the registration engine 310. Responsive to initiating said request, the registration engine 310 can send and/or transmit the request from the computing device 332 to the server 106, to register the mobile device 312. The registration engine 310 may interact with the browser 308(1) to render a code that can be used (e.g., used by the user via the mobile device 312) to register the mobile device 312. For instance, the registration engine 310 (and/or the server 106) can determine and/or provide (e.g., to the browser 308(1)) information associated with the credentials management service and/or the user, to be encoded in the code to be displayed and/or scanned. In another example, the registration engine 310 (and/or the server 106) may generate and/or provide the code to the browser 308(1). In some embodiments, the registration engine 310 can be located within, outside, or adjacent to the computing device 332. The registration engine 310 may comprise one or more programs or services that are executable individually or in some combination on hardware of the registration engine 310.

In some embodiments, the endpoint device 322 may be configured and/or designed to access and/or use one or more resources of the server 106 according to obtained user credentials. In one example, the endpoint device 322 may send and/or communicate a request for user credentials (and/or other private information of the user) to the server 106. Responsive to sending said request, the endpoint device 322 may receive and/or obtain the credentials (e.g., encrypted or decrypted credentials) from the mobile device 312 and/or the server 106, wherein the credentials can be used to access a corresponding resource of the server 106. In certain embodiments, the endpoint device 322 can include, store, or have access to a key of the endpoint device (e.g., a public key of the endpoint device). The endpoint device 322 can use the key of the endpoint device to decrypt the encrypted credentials provided by the server 106 (e.g., encrypted by the server 106 using the key of the endpoint device). In some embodiments, the endpoint device 322 may receive or otherwise obtain the encrypted or decrypted credentials responsive to authenticating the user of the mobile device 312 (e.g., via the mobile device 312 and/or the endpoint device 322). In certain embodiments, the endpoint device 322 and the computing device 332 can be a same device. In some embodiments, the endpoint device 322 and the computing device 332 can be separate and/or distinct devices.

Figure 4A:
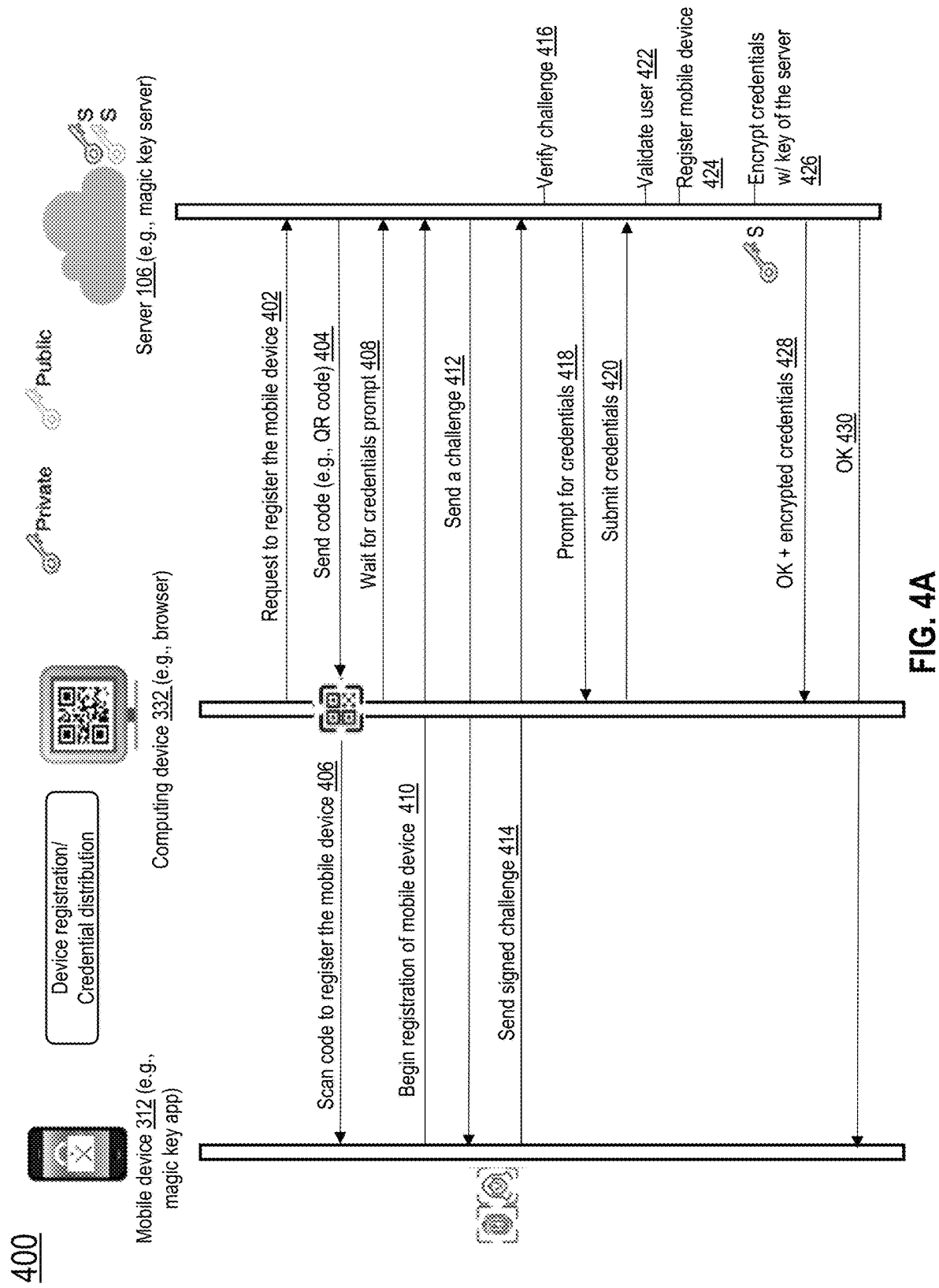
FIGS. 4A-4B are communication diagrams of a process for storing information of a user in a distributive fashion, in accordance with illustrative embodiments.
Figure 4B:
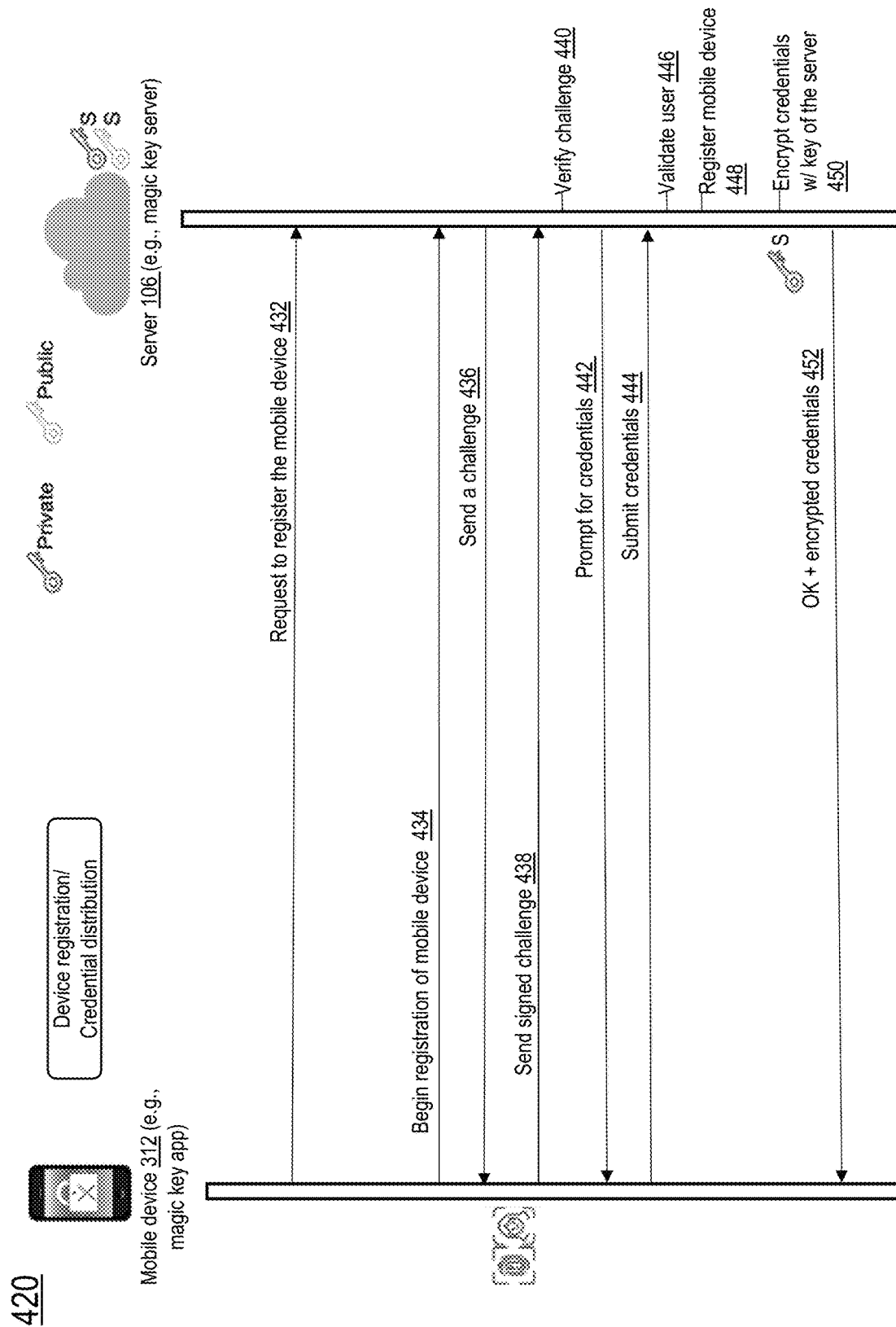

In certain embodiments, a user may attempt to access or otherwise use a resource and/or application via a computing device 322 and/or a mobile device 312, for example. However, the resource and/or application may require credentials (e.g., a username and/or password of the user) to provide the user with access to the particular resource/application. In certain non-preferred approaches, a single credentials management service would centrally store various credentials, as well as key(s) for encrypting the various credentials (if the stored credentials are encrypted), at a single device/server/storage/location of the service. However, for the reasons discussed herein, storing the encrypted credentials and the corresponding encryption key in the same location can introduce security risks into a network environment. As such, the systems and methods discussed herein include a novel approach for registering a mobile device 312 (as a trusted and/or user-authenticated device, that is not part of or directly accessible by the credentials management service) and storing encrypted credentials of the user in the registered mobile device 312 (e.g., as shown in FIGS. 4A-4B), as a means for creating a safe and distributed/separate storage for the encrypted credentials. The registration process can ensure that the mobile device is one authorized by the user (that owns the credentials) to store the encrypted credentials, by incorporating a code-sharing procedure and/or user authentication/validation procedure during the registration process. After storing the encrypted credentials, the mobile device 312 can operate as a secured repository from which to release the stored encrypted credentials, when the credentials are requested by the user to access a resource. For security reasons, the mobile device 312 may provide access to the stored encrypted credentials, only upon successful completion of a user authentication process (e.g., biometric authentication and/or other types of authentication) via the mobile device 312 (e.g., to verify/confirm the identity of the user of the mobile device 312). Moreover, the credentials management service maintains the key that can decrypt the encrypted credentials, without sharing the key with other devices such as the mobile device, and can be used to safely recover the credentials after the user is authenticated. Hence, these and other features can enhance security in the storage and use of credentials, as discussed further below.

Referring now to FIG. 4A, depicted is a communication diagram of an embodiment of a process 400 for storing private information of a user (e.g., credentials of the user) on at least one device of the user (e.g., a mobile device 312). In accordance with process 400, the computing device 332 may send, transmit, and/or communicate a request to the server 106 (402). The request may include or correspond to a request to register the mobile device 312 with the server 106. Responsive to receiving the request to register the mobile device 312, the server 106 may generate and/or send a code (e.g., a QR code) to the computing device 332 for registering the mobile device 312 (404). The computing device 332 may render (e.g., using a browser 308) the received code for the mobile device to scan. In some embodiments, the mobile device 312 may scan the code rendered by the computing device 332 to initiate a registration of the mobile device 312 (406). Responsive to the scan of the code, the computing device 332 may instruct or inform the server 106 to wait (for user authentication) to send a credentials prompt (e.g., a prompt to the user to provide the credentials) (408). In some embodiments, the mobile device 312 can initiate a registration of the mobile device 312 via the computing device 332 and/or the server 106 (410). In certain embodiments, the server 106 may send, transmit, and/or communicate a challenge to the mobile device 312 via the computing device 332 (412). The challenge may include or correspond to a challenge of a challenge-response authentication protocol, in which the server 106 presents a challenge to the user of the mobile device 312. Responsive to the challenge, the user of the mobile device 312 may be authenticated by providing a valid answer (e.g., valid biometric credentials) to the challenge.

Responsive to receiving the challenge from the server 106, the mobile device 312 may authenticate (e.g., using biometric authentication) the user of the mobile device 312. If the user is successfully authenticated, the mobile device 312 may send and/or transmit a signed challenge to the server 106 via the computing device 332 (414). The server 106 can verify and/or validate the received signed challenge (416). The server 106 may verify the signed challenge by validating the biometric authentication information provided by the user of the mobile device 312. Responsive to verifying the signed challenge, the server 106 may send a prompt to the user at the computing device 332 to provide the credentials (e.g., responsive to the authentication of the user on the mobile device 312) (418). The user may provide the credentials to the server 106 via the prompt (e.g., a credentials entry page loaded on a browser, or a user interface element, for receiving user input) of the computing device 332. The server 106 can receive the provided credentials from the computing device 332 (420). Responsive to receiving the credentials, the server 106 may validate the user of the mobile device 312 (422) and/or complete the registration of the mobile device (424). In certain embodiments, the server 106 may encrypt or otherwise encode the provided credentials using a key of the server (e.g., a private key of the server) (426). Once the credentials are encrypted, the server 106 can provide the encrypted credentials to the mobile device 312 for storage thereon (428 and 430).

In certain embodiments, the mobile device 312 can be registered by using the mobile device 312 and the server 106 (e.g., without using/involving the computing device 332, as seen in FIG. 4B). Referring now to FIG. 4B, depicted is a communication diagram of an embodiment of a process 420 for storing private information of a user (e.g., credentials of the user) on at least one device of the user (e.g., a mobile device 312). In accordance with process 420, the mobile device 312 may send, transmit, and/or communicate a request to the server 106 (432). The request may include or correspond to a request to register/enroll the mobile device 312 with the server 106, to store encrypted credentials on behalf of the user and/or server 106. In some embodiments, the mobile device 312 can initiate a registration/enrollment of the mobile device 312 via the server 106 (434). In certain embodiments, the server 106 may send, transmit, and/or communicate a challenge to the mobile device 312 (436). The challenge may include or correspond to a challenge of a challenge-response authentication protocol, in which the server 106 presents a challenge to the user of the mobile device 312. Responsive to the challenge, the user of the mobile device 312 may be authenticated by providing a valid answer (e.g., valid biometric credentials) to the challenge.

Responsive to receiving the challenge from the server 106, the mobile device 312 may authenticate (e.g., using biometric authentication) the user of the mobile device 312. If the user is successfully authenticated, the mobile device 312 may send and/or transmit a signed challenge to the server 106 (438). The server 106 can verify and/or validate the received signed challenge (440). The server 106 may verify the signed challenge (e.g., by validating the biometric authentication information provided by the user of the mobile device 312). Responsive to verifying the signed challenge, the server 106 may send a prompt to the user at the mobile device 312 to provide the credentials (e.g., responsive to the authentication of the user on the mobile device 312) (442). The user may provide the credentials to the server 106 via the prompt (e.g., a credentials entry page loaded on a browser, or a user interface element, for receiving user input) of the mobile device 312 (e.g., where the mobile device 312 does not retain the provided credentials locally or otherwise). The server 106 can receive the provided credentials from the mobile device 312 (444), and the mobile device may remove/delete its local copy (if any) of the credentials. Responsive to receiving the credentials, the server 106 may validate the user of the mobile device 312 (446) and/or complete the registration of the mobile device 312 (448). In certain embodiments, the server 106 may encrypt or otherwise encode the provided credentials using a key of the server (e.g., a private key of the server) (450). Once the credentials are encrypted, the server 106 can provide the encrypted credentials to the mobile device 312 for storage thereon (452).

In certain embodiments, a user may attempt to access or otherwise use a resource and/or application via the endpoint device 322, for example. However, the resource and/or application may use and/or require credentials (e.g., a username and/or password of the user) to provide the user with access to the particular resource/application. As such, an endpoint device 322, one or more servers 106, and/or a mobile device 312 can communicate with each other to obtain the encrypted credentials (e.g., stored in the mobile device 312) and/or a corresponding key (e.g., stored in the server 106), to therefore use the obtained/decrypted credentials to provide the user with access to the corresponding resource/application (e.g., as shown in FIG. 5).

Figure 5:
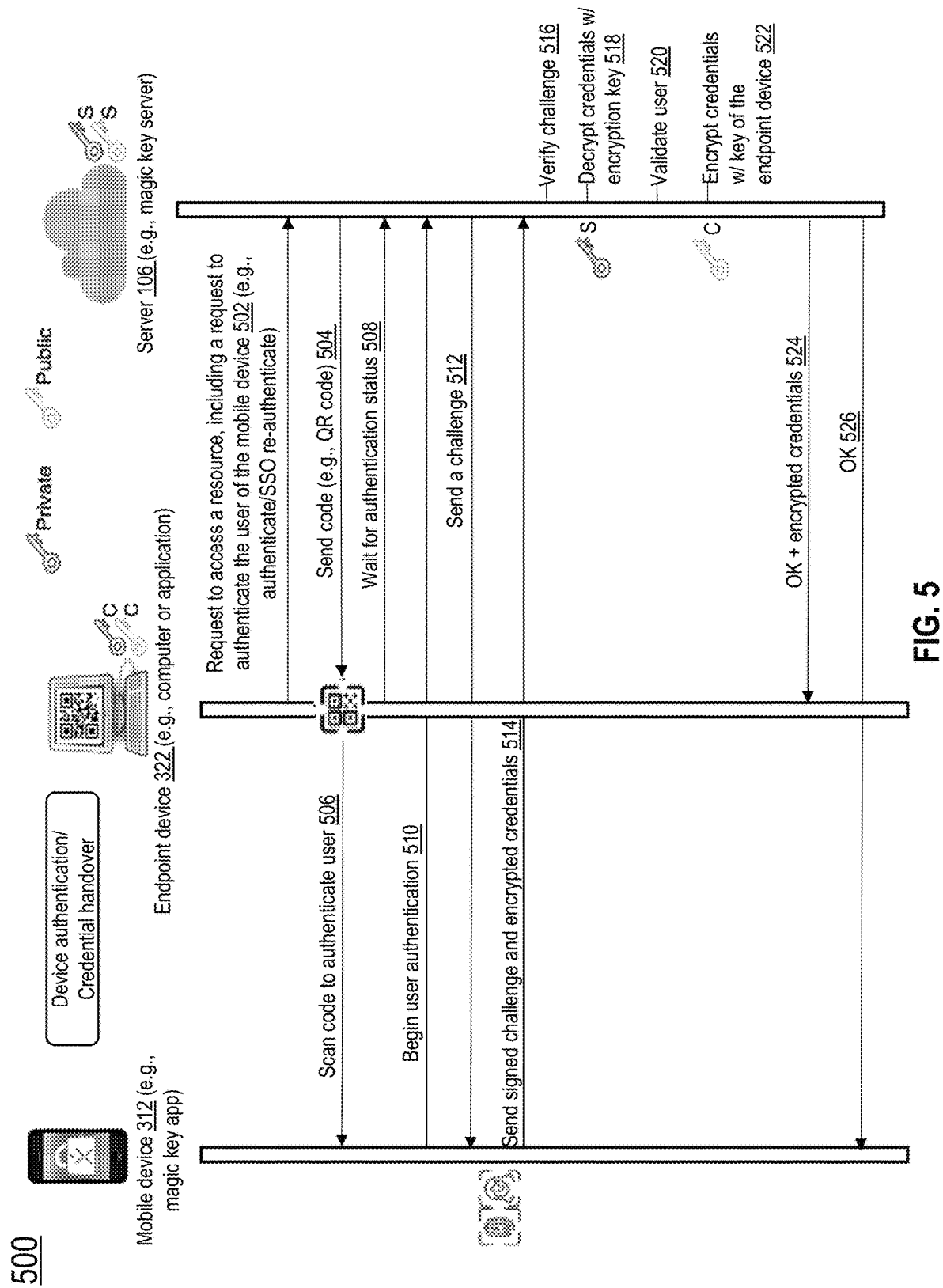
FIG. 5 is a communication diagram of a process for accessing information of a user stored in a distributive manner on at least one device of the user, in accordance with an illustrative embodiment.

Referring now to FIG. 5, depicted is a communication diagram of an embodiment of a process 500 for accessing private information of a user (e.g., credentials of the user) stored on at least one device of the user (e.g., a mobile device 312). In accordance with process 500, the endpoint device 322 may send, transmit, and/or communicate a request to the server 106 (502). The request may include or correspond to a request to access/use a resource and/or application (e.g., which includes or triggers a request to access stored credentials to authenticate and/or re-authenticate (e.g. SSO) a user of the mobile device 312. Responsive to receiving the request, the server 106 may generate and/or send a code (e.g., a QR code) to the endpoint device 322 to facilitate or initiate authenticating the user of the mobile device 312 (504). The endpoint device 322 may render (e.g., using a browser 308) the received code for the mobile device to scan. In some embodiments, the mobile device 312 may scan the code rendered by the endpoint device 322 to initiate an authentication of the user with the mobile device 312 (506). Responsive to the scan of the code, the endpoint device 322 may instruct the server 106 to wait for an authentication status of the user of the mobile device 312 (508). In some embodiments, the mobile device 312 can initiate an authentication of a user of the mobile device 312 via the endpoint device 322 and/or the server 106 (510). In certain embodiments, the server 106 may send, transmit, and/or communicate a challenge to the mobile device 312 via the endpoint device 322 (512). The challenge may include or correspond to a challenge of a challenge-response authentication protocol, in which the server 106 presents a challenge to the user of the mobile device 312. Responsive to the challenge, the user of the mobile device 312 may be authenticated by providing a valid answer (e.g., valid biometric credentials) to the challenge.

Responsive to receiving the challenge from the server 106, the mobile device 312 may authenticate (e.g., using biometric authentication) the user of the mobile device 312. If the user is successfully authenticated, the mobile device 312 may send and/or transmit a signed challenge and/or the encrypted credentials to the server 106 via the endpoint device 322 (514). The server 106 can verify and/or validate the received signed challenge (516). The server 106 may verify the signed challenge by validating the biometric authentication information provided by the user of the mobile device 312. Responsive to verifying the signed challenge, the server 106 may decrypt or otherwise decode the received encrypted credentials using a key of the server (e.g., a private key of the server) (518). Responsive to decrypting the received credentials, the server 106 may validate (e.g., complete a validation of) the user of the mobile device 312 (520). In certain embodiments, the server 106 may encrypt or otherwise encode the decrypted credentials using a key of the endpoint device 322 (e.g., a public key of the server) (522). Once the credentials are encrypted, the server 106 can provide the encrypted credentials to the endpoint device 322 for usage (524). In certain embodiments, the server 106 can provide an indication (e.g., to the mobile device 312) that the encrypted credentials have been successfully provided to the endpoint device 322 (526). Once the encrypted credentials are provided to the endpoint device 322 (e.g., by the server 106), the encrypted credentials can be used to (authenticate the user to) access the resource and/or application (e.g., via the endpoint device 322). For instance, the endpoint device 322 may provide the obtained encrypted credentials to another server 106, wherein the another server 106 hosts or otherwise includes the resource/application. Responsive to receiving the encrypted credentials, the another server 106 may use the credentials to (authenticate the user so as to be able to) provide the user with access to the resource/application via the endpoint device 322.

Referring to FIG. 6, depicted is a flow diagram of one embodiment of a method 600 for storing and/or maintaining private information of a user (e.g., credentials of the user) on at least one device of the user. The functionalities of the method may be implemented using, or performed by, the components detailed herein in connection with FIGS. 1-5. In brief overview, a server 106 may receive a request to register a mobile device 312 (602). The server 106 may send a code for registering the mobile device 312 (604). The server 106 may register the mobile device 312 for storing user credentials (606). The server 106 may encrypt the credentials using a key of the server (608). The server 106 may send the encrypted credentials without the key of the server (610). The server 106 may send a code for user authentication (612). The server 106 may receive encrypted credentials from the mobile device 312 (614). The server 106 may decrypt the encrypted credentials (616). The server 106 may send the decrypted credentials (618).

Referring now to operation (602), and in some embodiments, the server 106 may receive or otherwise obtain a request from a computing device 332. The request may include or correspond to a request to register at least one mobile device 312. In certain embodiments, the server 106 may send, transmit, and/or communicate a code (e.g., a QR and/or other 2D codes) to the computing device 332 (604). The code can be for registering the mobile device 312 with the server 106. In certain embodiments, the computing device 332 can render, illustrate, depict, or otherwise provide the code (e.g., via a display or screen of the computing device 332) as a QR code and/or a scannable code. In one example, the server 106 may cause the computing device 332 to render the code (e.g., by sending and/or providing the code to the computing device 332). In some embodiments, the user may scan the code with use of the mobile device 312, thereby initiating and/or causing a user authentication process on the mobile device 312. In certain embodiments, the server 106 may send and/or transmit a prompt (e.g., a push notification) to the user of the mobile device 312 to provide the credentials (e.g., via the computing device 332). For instance, responsive to an authentication of the user on the mobile device 312 (e.g., receiving a signed challenge from the mobile device 312), the server 106 can send a prompt to the user to provide the credentials via the computing device 332. The server 106 may receive the credentials from the computing device 332, for example.

Referring now to operation (606), and in some embodiments, the server 106 may register a mobile device 312 to store and/or maintain information of a user (e.g. credentials of a user, such as a username or password) thereon. The server 106 may register the mobile device 312 based on (or according to) an authentication (e.g., a biometric authentication, such as face recognition and/or fingerprint recognition approaches) of the user of the mobile device 312. Upon registration of the mobile device 312, the server 106 may receive and/or obtain credentials of the user from a computing device 332, for instance. In one example, the server 106 may send a prompt to the user to provide the credentials via the computing device 332 (e.g., responsive to an authentication of the user). The user may submit or otherwise provide the credentials via the prompt in the computing device 332. In certain embodiments, the user can submit or otherwise provide the credentials via the mobile device 312 (e.g., without using the computing device 332). Responsive to receiving the credentials, the server 106 may encrypt the received credentials (e.g., by using a private key of the server).

Referring now to operation (608), and in some embodiments, the server 106 may encrypt or otherwise encode (e.g., using a cryptographic engine 314) information of the user. For example, a cryptographic engine 314 of the server 106 can encrypt credentials of the user (e.g. secret information of the user to be stored on the mobile device 312) by using (or based on) a key of the server (e.g. a public key of the server). Responsive to encrypting the credentials, the server 106 may send, provide, specify, and/or indicate the encrypted credentials to the registered mobile device 312 (610). The server 106 may send the encrypted credentials to the registered mobile device 312, without storing the encrypted credentials in the server 106 (e.g., the credentials and the encrypted credentials are purged or removed from the server 106). The server 106 may send the encrypted credentials to the registered mobile device 312, without providing or sharing the key with the registered mobile device 312. The registered mobile device 312 may receive the encrypted credentials from the server 106, wherein the encrypted credentials can be maintained or stored in a storage 318 of the mobile device 312. The registered mobile device 312 may store the encrypted credentials without having access to or storing the key of the server, thereby securely storing the encrypted credentials at a decentralized location.

Referring now to operation (612), and in some embodiments, the server 106 may send, generate, and/or provide a code (e.g., a QR code) to an endpoint device 322 (e.g., to initiate a transfer of the encrypted credentials from the mobile device to the server). In one example, the server 106 can send and/or provide the code responsive to a request for the credentials from an endpoint device 322. For instance, a user may attempt to access at least one resource via the endpoint device 322. To obtain the credentials associated with the resource(s) (e.g., for a particular user), the endpoint device 322 may send a request for the credentials (e.g., a request to obtain the credentials) to the server 106. In some embodiments, and responsive to receiving the request for the credentials, the server 106 can determine a mobile device 312 (e.g., from one or more devices of a user) registered with the server 106 (e.g., to determine which mobile device 312 is storing an encrypted version of the credentials). In certain embodiments, and responsive to receiving said request, the server 106 may send the code to the endpoint device 322. In certain embodiments, the request for the credentials can launch and/or initiate an authentication of the user with use of the mobile device 312. For instance, sending the code to the endpoint device 322 responsive to the request for the credentials can initiate an authentication process of the user, wherein the user can use the mobile device 312 to scan the code and initiate the authentication process. In response to successful authentication of the user at the mobile device (e.g., authenticated approval by the user and/or authenticated user request for retrieval of the credentials), the server 106 may receive the encrypted credentials from the mobile device 312 (e.g., along with or via a signed challenge of a challenge-response protocol) (614).

Referring now to operation (616), and in some embodiments, the server 106 may decrypt, decode or otherwise obtain (e.g., using the cryptographic engine 314) the received encrypted credentials (e.g., an encrypted version of the credentials, received from the mobile device 312). In one example, the server 106 may decrypt the encrypted credentials using an encryption key of the server 106 (e.g., a private key of the server). Responsive to decrypting the encrypted credentials, the server 106 may send the decrypted credentials to the endpoint device 322 (e.g., to enable access to a remote application via the endpoint device) (618). Upon receiving the decrypted credentials, the endpoint device 322 can authenticate the user at the endpoint device 322. If the user is successfully authenticated using the credentials, the user can access or use at least one resource and/or application of the server 106 via the endpoint device 322 and/or the mobile device 312, for instance (e.g., according to the received decrypted credentials). In certain embodiments, the server 106 may encrypt the decrypted credentials of the user prior to sending the credentials to the endpoint device 322. For instance, the server 106 may encrypt the credentials according to (or by using) a key of the endpoint device (e.g., a public key), without storing the encrypted credentials in the server 106 (e.g., the decrypted credentials and encrypted credentials are purged or removed from the server 106). Responsive to encrypting the credentials, the server 106 can send the encrypted credentials to the endpoint device 322, without sending the key of the endpoint device (e.g., the key is secured or maintained at the server 106). As such, the encrypted credentials and/or one or more keys of the server 106 can be stored separately for enhanced security/protection. For example, the encrypted credentials may be stored across one or more devices of the user (e.g., mobile devices 312) without the keys that are used to encrypt the credentials, instead of stored with the keys in a centralized manner, such as in the server 106.

Referring to FIG. 7, depicted is a flow diagram of one embodiment of a method 700 for accessing stored private information of a user (e.g., credentials of the user) on at least one device of the user. The functionalities of the method may be implemented using, or performed by, any one or more of the components detailed herein in connection with FIGS. 1-5. In brief overview, a server 106 may receive a request to authenticate a user (710). The server 106 may send a code for user authentication (712). The server 106 may receive encrypted credentials from the mobile device 312 (714). The server 106 may decrypt the encrypted credentials (716). The server 106 may send the decrypted credentials (718).

Referring now to operation (710), the server 106 may receive, obtain, and/or acquire a request (e.g., to access a resource or application). The request may include or correspond to a request (for credentials) to authenticate a user of the mobile device 312 (e.g. see step 502 of FIG. 5). For example, a user may attempt to access or otherwise use a resource and/or application via an endpoint device 322, for instance. Responsive to the attempt to access the application/resource, the endpoint device 322 can launch and/or initiate an authentication process (or a re-authentication process via SSO, for example), in which the identity of the user is validated/confirmed. Therefore, the endpoint device 322 may send or transmit an authentication request to the server 106 (e.g., in response to an attempt to access a resource/application). Responsive to receiving the authentication request, the server 106 may send, generate, and/or provide a code (e.g., a QR code) to an endpoint device 322 (712), to initiate a release of credentials to authenticate the user. Operations (712) to (718) of method 700 may include one or more features described in connection with operations (612) to (618) of method 600 (as shown in FIG. 6). Once the server 106 sends and/or provides the decrypted credentials to the endpoint device 322, the decrypted credentials can be used to provide the user with access to an application/resource via the endpoint device 322.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
registering, by a server, a mobile device to store credentials of a user thereon, based on authentication of the user of the mobile device;
encrypting, by the server, credentials of the user using a key of the server;
sending, by the server, the encrypted credentials to the registered mobile device for storage thereon without the key;
sending, by the server responsive to a request for the credentials from an endpoint device different than the mobile device, a code to the endpoint device to initiate authentication of the user with use of the mobile device, to initiate a transfer of the encrypted credentials from the mobile device to the server;
receiving, by the server, the encrypted credentials from the mobile device in response to the authentication of the user;
decrypting, by the server, the encrypted credentials using an encryption key of the server; and
sending, by the server, the decrypted credentials to the endpoint device to authenticate the user at the endpoint device, to enable access to a remote application via the endpoint device;
wherein sending the credentials to the endpoint device comprises encrypting, by the server, the credentials using a key of the endpoint device.

2. The method of claim 1, comprising:
receiving, by the server, a request from a computing device to register the mobile device; and
sending, by the server, a code to the computing device for registering the mobile device with the server.

3. The method of claim 2, comprising:
causing the computing device to render the code as a quick response (QR) or scannable code, for the mobile device to scan.

4. The method of claim 1, comprising:
sending, by the server, a prompt to the user to provide the credentials, responsive to the authentication of the user on the mobile device.

5. The method of claim 4, comprising:
receiving, by the server, the credentials of the user from a computing device.

6. The method of claim 1, comprising:
sending, by the server to the endpoint device, the credentials encrypted using the key of the endpoint device.

7. A method comprising:
registering, by a server, a mobile device to store credentials of a user, based on authentication of the user on the mobile device;
receiving, by the server, credentials of the user;
encrypting, by the server, the credentials using a key of the server;
sending, by the server, the encrypted credentials to the registered mobile device for storage thereon without the key;

receiving, by the server, the encrypted credentials responsive to the authentication of the user;
decrypting, by the server, the encrypted credentials to obtain the credentials, using the key of the server;
encrypting, by the server, the credentials using a key of an endpoint device; and
sending, by the server to the endpoint device, the credentials encrypted using the key of the endpoint device.

8. The method of claim 7, comprising:
receiving, by the server, a request from a computing device to register the mobile device; and
sending, by the server, a code to the computing device for registering the mobile device with the server.

9. The method of claim 8, comprising:
causing the computing device to render the code as a quick response (QR) or scannable code, for the mobile device to scan.

10. The method of claim 7, comprising:
sending, by the server, a prompt to the user to provide the credentials, responsive to the authentication of the user on the mobile device.

11. The method of claim 10, comprising:
receiving, by the server, the credentials of the user from a computing device.

12. The method of claim 7, comprising:
receiving, by the server, a request from the endpoint device for the credentials; and
sending, by the server, a code to the endpoint device to initiate authentication of the user at the mobile device.

13. A method, comprising:
receiving, by a server, a request from an endpoint device for credentials of a user;
determining, by the server, a mobile device registered with the server for storing an encrypted version of the credentials;
sending, by the server, a code to the endpoint device to initiate authentication of the user at the mobile device, to initiate a transfer of the encrypted credentials from the mobile device to the server;
receiving, by the server from the mobile device, the encrypted version responsive to the authentication of the user;
obtaining, by the server, the credentials from the encrypted version, using an encryption key of the server; and
encrypting, by the server, the credentials using a key of the endpoint device.

14. The method of claim 13, comprising:
sending, by the server to the endpoint device, the credentials encrypted using the key of the endpoint device.

* * * * *